United States Patent
Henshaw et al.

(10) Patent No.: US 10,555,174 B2
(45) Date of Patent: Feb. 4, 2020

(54) RESTRICTED-USE AUTHENTICATION CODES

(71) Applicant: Microsoft Technology Licensing, LLC, Redmond, WA (US)

(72) Inventors: Jeffrey David Henshaw, Redmond, WA (US); Marc R. Whitten, Bellevue, WA (US); Michael Palotas, Seattle, WA (US); Mark Plagge, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/054,560

(22) Filed: Aug. 3, 2018

(65) Prior Publication Data

US 2018/0343564 A1    Nov. 29, 2018

Related U.S. Application Data

(63) Continuation of application No. 13/748,408, filed on Jan. 23, 2013, now Pat. No. 10,051,467.

(51) Int. Cl.
*H04L 29/06* (2006.01)
*H04W 12/06* (2009.01)
*H04L 29/08* (2006.01)

(52) U.S. Cl.
CPC ......... *H04W 12/06* (2013.01); *H04L 63/0853* (2013.01); *H04L 67/04* (2013.01);
(Continued)

(58) Field of Classification Search
None
See application file for complete search history.

(56) References Cited

U.S. PATENT DOCUMENTS 8,627,438 B1 *   1/2014   Bhimanaik   ............. H04L 63/10
                                                    726/9
9,143,944 B2 *   9/2015   Gong   .................... H04W 12/08
(Continued)

FOREIGN PATENT DOCUMENTS

JP    2004171039 A    6/2004
WO    2012152995 A1   11/2012

OTHER PUBLICATIONS

David Strom "How the Ultra-Mobile PC Works" Apr. 27, 2006. HowStuffWorks.com. <https://computer.howstuffworks.com/ultra-mobile-pc.htm> Jun. 3, 2019 (Year: 2006).*

(Continued)

*Primary Examiner* — Jeffery L Williams
(74) *Attorney, Agent, or Firm* — Alleman Hall Creasman & Tuttle LLP

(57) ABSTRACT

Embodiments related to a restricted-use authentication code are disclosed. One disclosed embodiment provides a method of generating a representation of a restricted-use authentication code for detection by another computing device to authenticate the other computing device to a remote service. The method includes receiving authentication information, the authentication information comprising a restricted-use authentication code and generating a representation of the authentication information. The method further includes presenting the representation of the authentication information to a sensor system of the other computing device for authentication.

20 Claims, 9 Drawing Sheets

(52) U.S. Cl.
CPC ........ *H04L 67/10* (2013.01); *A63F 2300/401* (2013.01); *A63F 2300/403* (2013.01); *H04L 63/18* (2013.01); *H04L 67/12* (2013.01)

(56) References Cited

U.S. PATENT DOCUMENTS

| | | | | |
|---|---|---|---|---|
| 2006/0269061 | A1* | 11/2006 | Balasubramanian | ........................ C07D 209/88 380/247 |
| 2007/0027964 | A1* | 2/2007 | Herrod | ................ H04L 41/0806 709/220 |
| 2007/0174198 | A1* | 7/2007 | Kasahara | ............... G06Q 30/04 705/51 |
| 2009/0265776 | A1* | 10/2009 | Baentsch | ................ H04L 63/08 726/9 |
| 2010/0070759 | A1* | 3/2010 | Leon Cobos | ........... G06F 21/43 713/155 |
| 2011/0095081 | A1* | 4/2011 | Zsigmond | ............... H04L 67/34 235/375 |
| 2012/0042363 | A1* | 2/2012 | Moosavi | ............... H04L 9/3228 726/5 |
| 2012/0078751 | A1* | 3/2012 | MacPhail | ............... G06Q 20/06 705/26.41 |
| 2012/0138680 | A1* | 6/2012 | Litz | .................... G07C 9/00158 235/382.5 |
| 2012/0203693 | A1* | 8/2012 | Morgan | ................ H04W 12/06 705/40 |
| 2012/0204245 | A1* | 8/2012 | Ting | ........................ G06F 21/35 726/6 |
| 2013/0276075 | A1* | 10/2013 | Gong | .................... H04W 12/08 726/5 |
| 2014/0173695 | A1* | 6/2014 | Valdivia | .................. G06F 21/36 726/4 |
| 2014/0208400 | A1* | 7/2014 | Henshaw | ............ H04L 63/0853 726/5 |
| 2014/0215589 | A1* | 7/2014 | Dietrich | .................. G06F 21/34 726/6 |
| 2014/0225711 | A1* | 8/2014 | Warrier | ................. G06F 21/305 340/5.51 |
| 2016/0226675 | A1* | 8/2016 | Zsigmond | ............... H04L 67/34 |
| 2018/0343564 | A1* | 11/2018 | Henshaw | ............ H04L 63/0853 |

OTHER PUBLICATIONS

"Office Action Issued in European Patent Application No. 14703216.3", dated Aug. 16, 2017, 6 Pages.

"Third Office Action Issued in Chinese Patent Application No. 201480005847.7", dated Jun. 20, 2018, 11 Pages.

"Notice of Allowance Issued in Japanese Patent Application No. 2015-553836", dated Sep. 12, 2018, 6 Pages.

* cited by examiner

RESTRICTED-USE AUTHENTICATION CODES

CROSS REFERENCE TO RELATED APPLICATIONS

This application is a continuation of U.S. patent application Ser. No. 13/748,408, filed Jan. 23, 2013, the entire contents of which is hereby incorporated herein by reference for all purposes.

BACKGROUND

Setting up some types of computing systems, such as gaming consoles, may involve entering strings of characters, such as user names, user passwords, wireless settings, wireless passwords, and other information to authenticate the computing system and connect the computing system to a wireless network. However, some such computing systems may utilize user input devices not primarily designed for the input of character strings. For example, a video game controller may not include controls tailored for entry of alphanumeric or other character-based inputs, but instead may include directional and trigger-type controls. Therefore, entering character strings for such computing devices may be time-consuming and cumbersome.

SUMMARY

Embodiments are disclosed herein that relate to the generation and use of authentication codes for authenticating a computing device. For example, one disclosed embodiment includes receiving authentication information at a mobile device, the authentication information including a restricted-use authentication code configured to be expired after use, and generating a representation of the authentication information via the mobile device. The method further comprises presenting the authentication information via the mobile device to a sensor system of another computing device for authentication of the other computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, setting up a device, such as a smart phone, a tablet computer, a personal computer, a mobile computing device, and/or any other suitable computing device, may involve inputting strings of character-based data, such as a user name, password, wireless settings information, device and/or application identifiers, etc. In some instances, these inputs may be provided, for example, by using a joystick and/or directional pad to individually scroll through and select each character on a keyboard displayed on a display device. Similar processes may be repeated for associating an additional user profile and/or a companion device (e.g. a tablet computer, a smart phone, etc.) with the gaming console, for purchasing content via the gaming console, and/or for other functions.

Thus, embodiments are disclosed herein that relate to facilitating user experiences surrounding such functions. Briefly, the disclosed embodiments allow a user to enter information via a second computing device, such as phone, notepad or tablet computer, laptop computer, etc., to perform a function via a first computing device, such as initial setup authentication, additional user authentication, content purchasing, etc. The information entered via the second device is sent to a remote service, which produces an authentication code and sends the authentication code to the second device. The second device may then be used to present the authentication code to the first device, for example, as an image and/or audio output, in order to authenticate the first device with the remote service. After the authentication code is used, the remote service expires the code in order to prevent unauthorized parties from later accessing and utilizing the authentication code.

Figure 1:
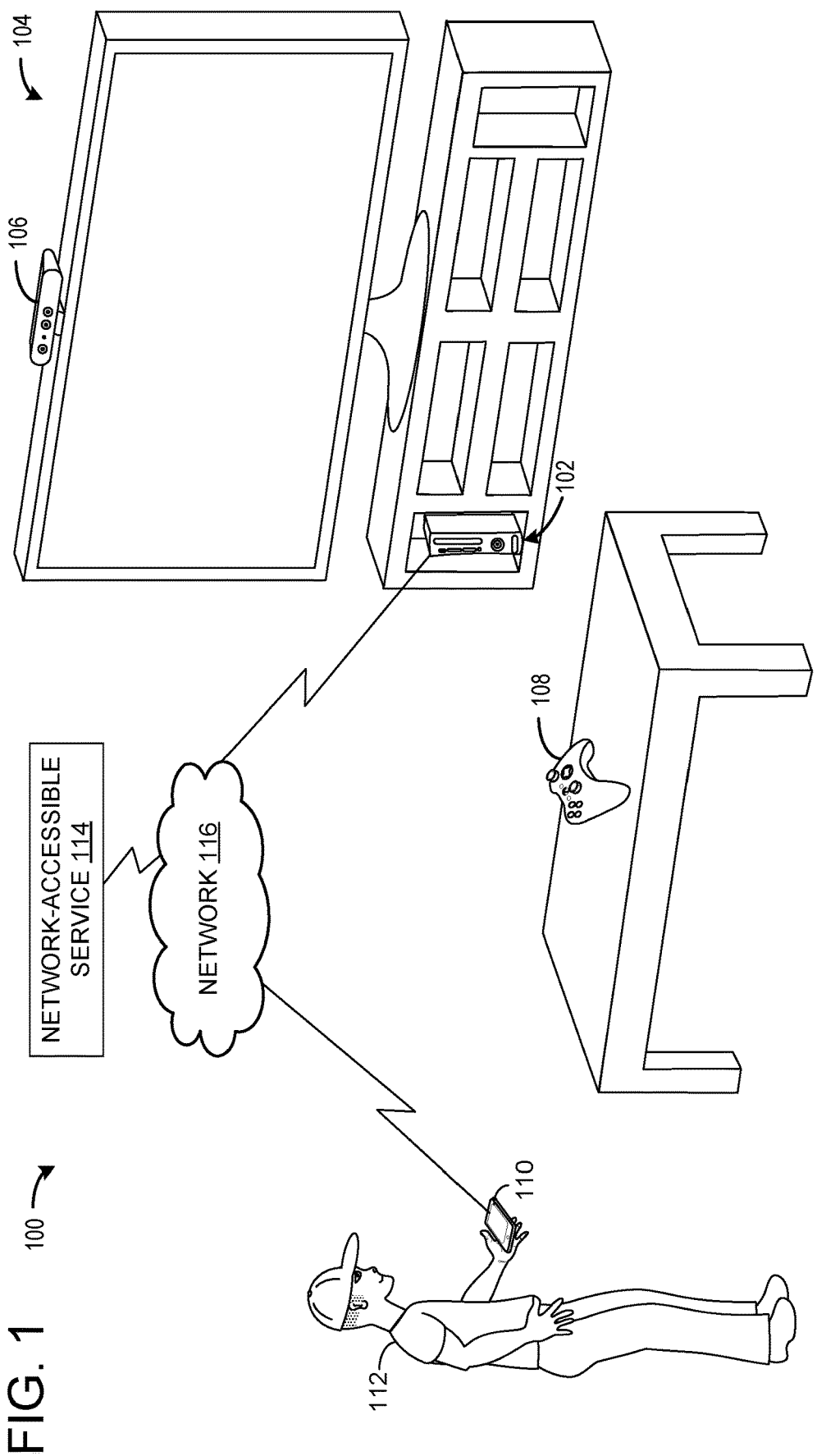
FIG. 1 shows a use environment for performing authentication in accordance with an embodiment of the present disclosure.

FIG. 1 shows an example use environment 100 for performing such authentication processes. The use environment 100 includes a first computing device 102, which may represent any suitable computing device, including but not limited to a gaming console, a personal computing device, a mobile computing device, etc. The first computing device 102 may be communicatively connected with other devices, such as a display device 104 for providing output images and a sensor system 106 for receiving inputs. The sensor system 106 may comprise any suitable sensors, including but not limited to one or more depth cameras, one or more two-dimensional cameras, and/or one or more microphones. The first computing device 102 may also receive input from a hand-held user input device 108. The hand-held user input device 108 may comprise any suitable user input device, including but not limited to a game controller, a mouse, a motion sensor, etc. The use environment 100 also includes a second computing device 110, and a user 112. The second computing device 110 may represent any suitable computing device, including but not limited to a mobile device (e.g. smartphone, tablet computer, notepad computer, laptop computer), a desktop computer, etc. Further, the second computing device 110 may include additional and/or different input mechanisms in comparison to those utilized by the first computing device 102.

The first computing device 102 and the second computing device 110 may communicate with a network-accessible service 114 via a network 116 (e.g. a computer network and/or a cellular phone network). As explained in more detail below, the network-accessible service may be used to authenticate the first computing device via user inputs made via the second computing device. The first computing device 102 may also communicate with the second computing device 110 via one or more suitable wireless and/or wired communication protocols, including but not limited to WiFi, Wifi direct, Bluetooth, Near Field Communication (NFC), etc.

Figure 2:
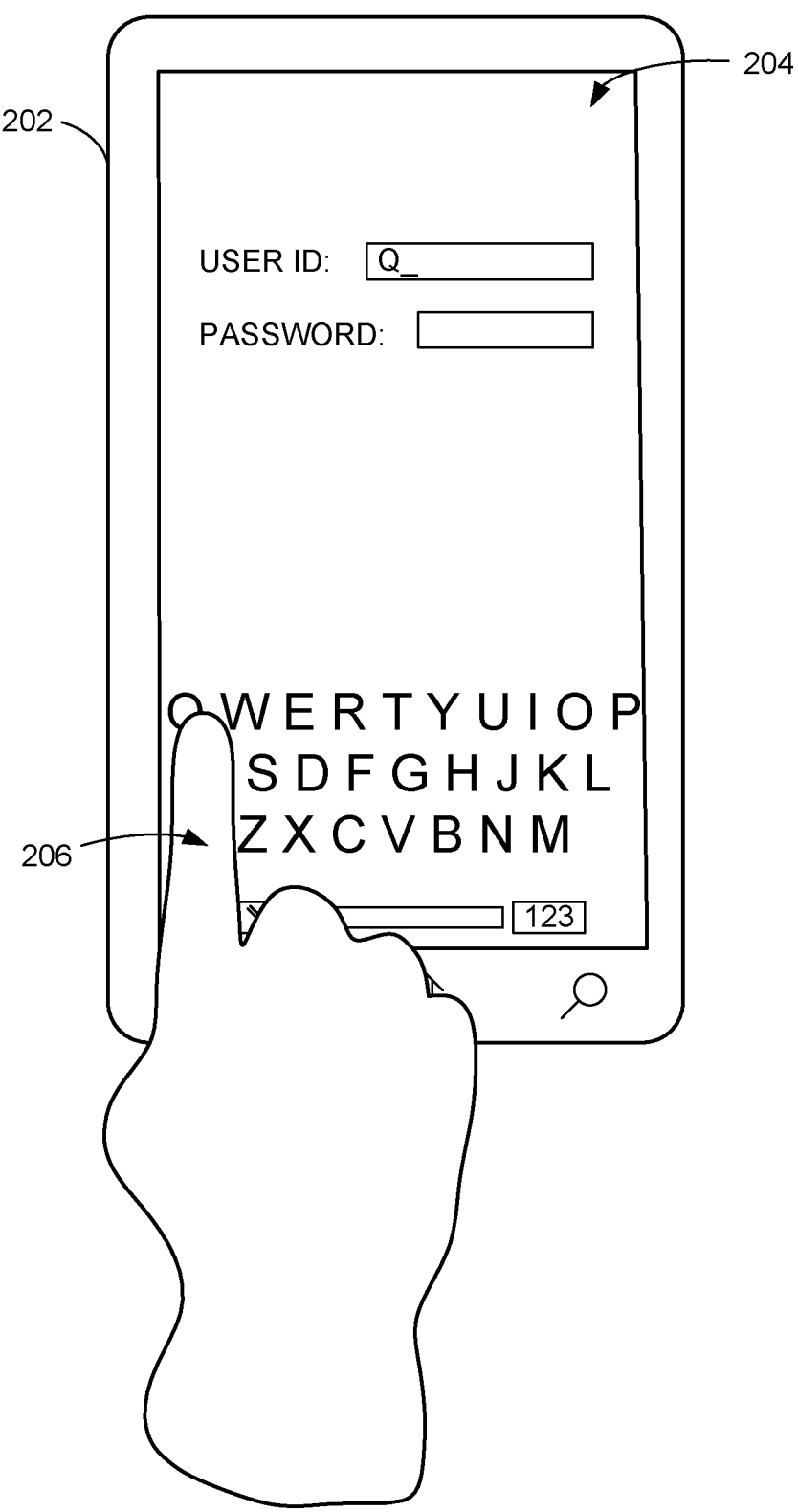
FIG. 2 shows an example user interface for a mobile device to receive an input of user information for the authentication of another computing device in accordance with an embodiment of the present disclosure.
Figure 4:
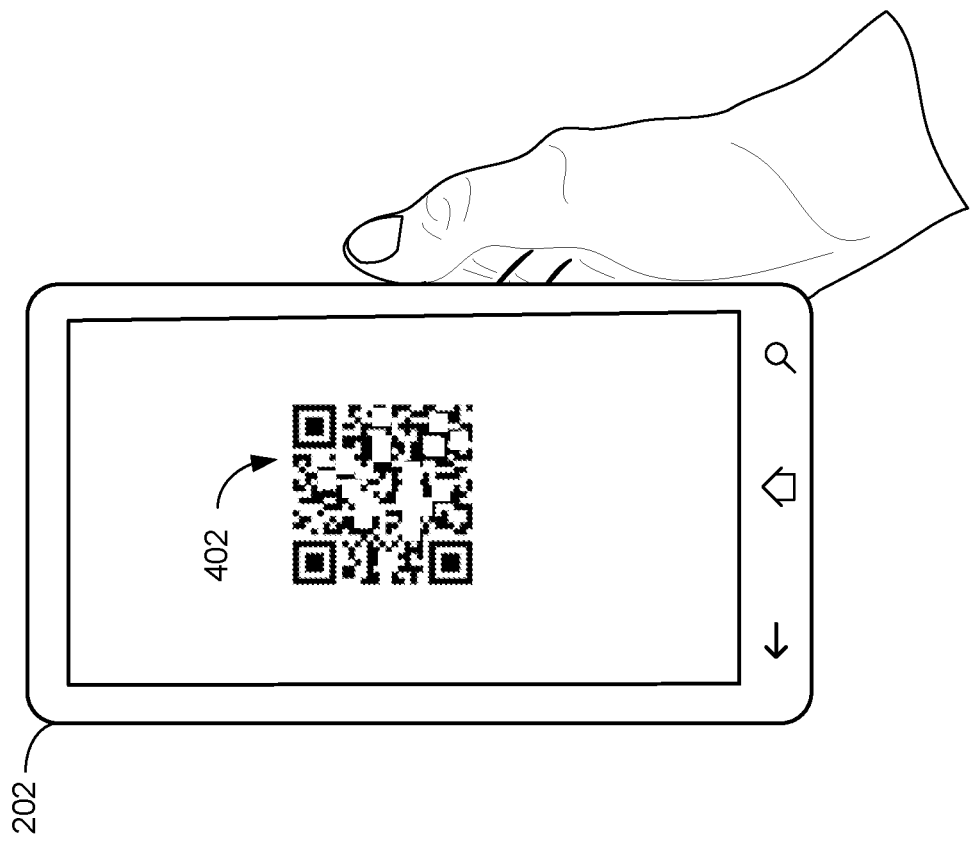
FIG. 4 shows an example representation of authentication information displayed on the mobile device of FIG. 2 in accordance with an embodiment of the present disclosure.
Figure 3:
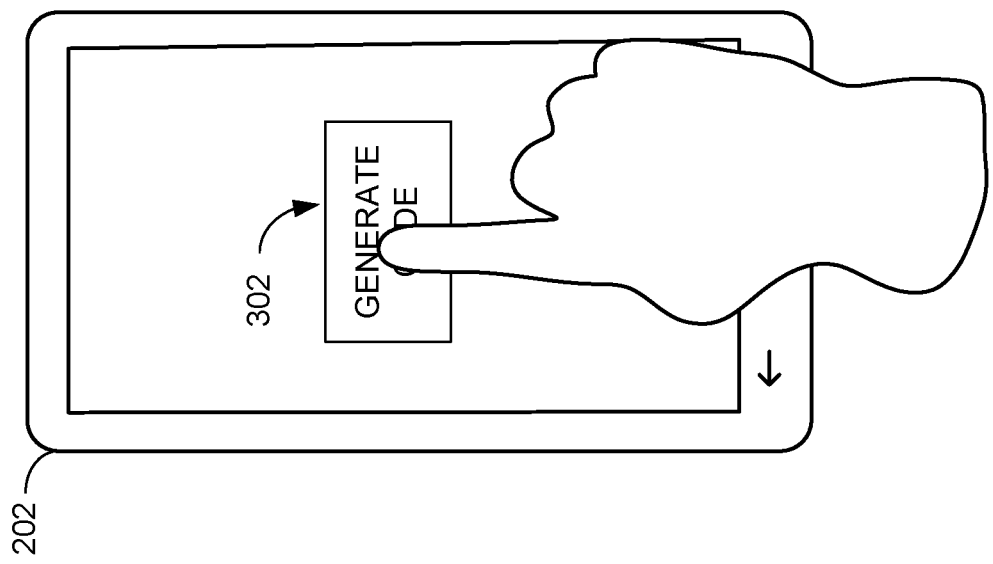
FIG. 3 shows an example user interface of the mobile device of FIG. 2 for sending a request to a remote service to obtain a restricted-use authentication code in accordance with an embodiment of the present disclosure.

As mentioned above, a user may perform authentication processes for the first computing device 102 via user inputs made via the second computing device 110. FIGS. 2-4 show examples of user interfaces on an example mobile device 202 as a user proceeds a process of authenticating a first computing device via the mobile device 202. It will be understood that, in some embodiments, the mobile device 202 may correspond to the second computing device 110 shown in FIG. 1. First, as illustrated in FIG. 2, the user may interact with an application on the mobile device to display a user interface 204 with which the user may enter information via touch via a software (or hardware) keyboard. The user may enter any suitable information, including but not limited to the depicted user ID and password for a network-accessible service, such as service 114 of FIG. 1. Upon entering a valid user ID and password, the user may be logged in to the remote service.

After logging in, the user may indicate that another computing device is ready to be setup and/or associated with the user. Thus, as illustrated in FIG. 3, the mobile device 202 and/or the application running on the mobile device 202 may provide a user interface control 302 upon indication that the user wishes to setup or otherwise authenticate another computing device. In response to the user selecting the user interface control 302, the mobile device sends a request the remote service for a restricted-use authentication code, wherein the term "restricted-use" signifies that the code is expired upon the occurrence of one or more designated events. Examples of expiration events include, but are not limited to, use of the authentication code and expiration of a preselected period of time from code generation.

Upon receipt of the restricted-use authentication code, the mobile device 202 then generates a representation of the restricted-use authentication code, and potentially of other authentication information, for presentation to the first computing device. FIG. 4 illustrates an example of a representation of authentication information 402, in the form of an optically readable tag comprising a graphical code displayed on a display screen of the mobile device 202. It will be understood that the authentication information may be presented in any suitable manner. For example, the authentication code may be presented visually as one or more alphanumeric characters, a Universal Product Code (UPC), a Quick Response (QR) code, and/or any other suitable image that may be decoded by another computing device. A visual authentication code, as described above, may also be presented physically. For example the visual authentication code may be printed or otherwise recorded on a physical medium, such as paper, a product packaging material, or any other suitable material.

The authentication information may also be presented as an audio representation comprising one more audio signals decodable by another computing device. In some embodiments, the representation of authentication information may include both visual and audio elements. Additionally, the representation may be a digital representation transmittable by other direct communications channel than visual and audio channels, such as a NFC channel, Bluetooth channel, WiFi direct channel, etc. In some embodiments, the authentication information may presented using a combination of multiple devices, media, methods, etc. For example, authentication information may be transmitted from one device to another device via a network (e.g., emailed from one user to another user) and printed from the other device onto a sheet of paper. As another example, authentication information may be presented by mass producing and distributing a representation of the authentication information with product packaging and/or as a standalone product. In some embodiments, the authentication information may be used in conjunction with a sweepstakes, giveaway, contest, and/or other promotional campaign.

Figure 5:
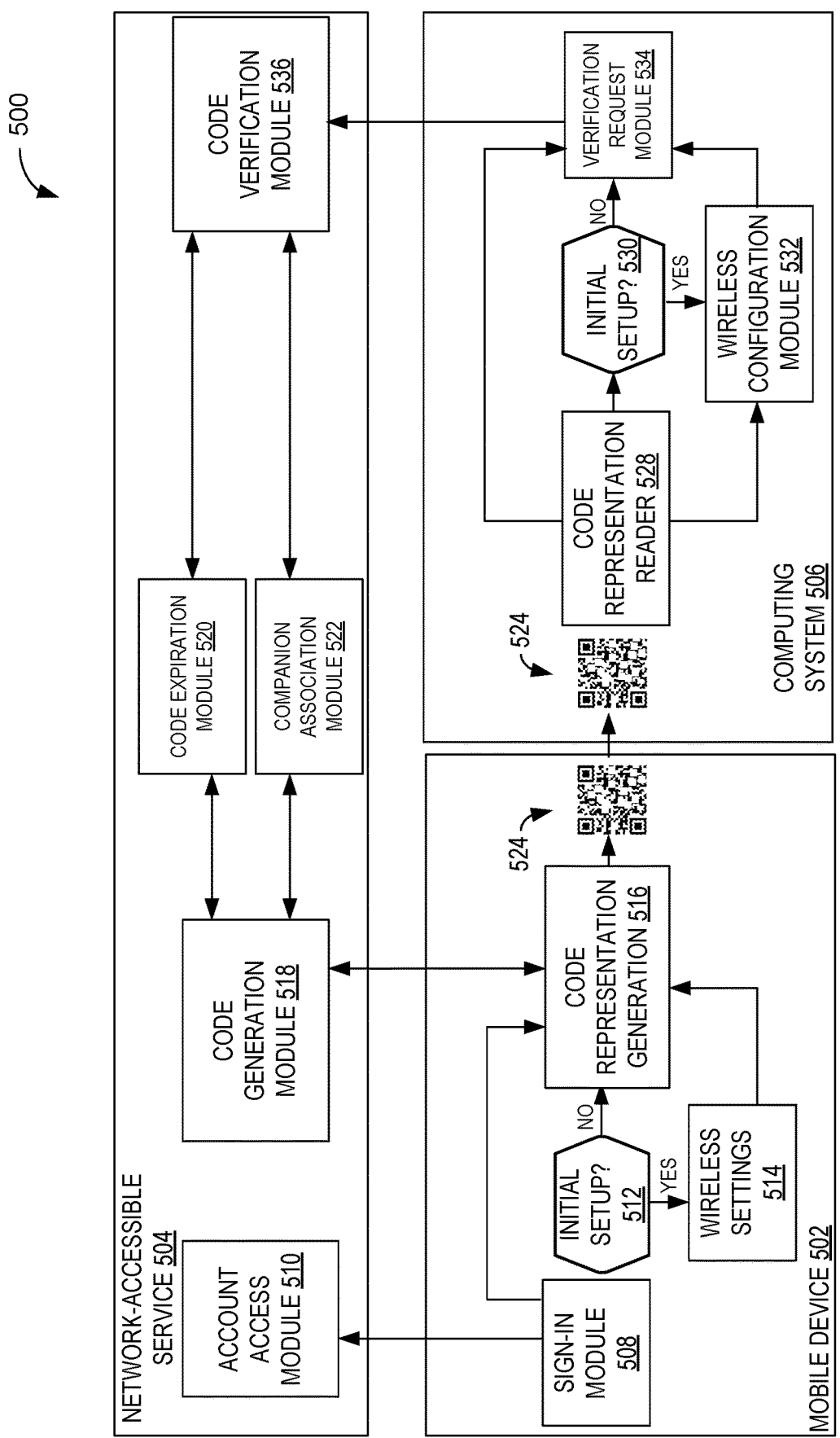
FIG. 5 schematically shows an example authentication system in accordance with an embodiment of the present disclosure.

FIG. 5 shows a block diagram of an authentication system 500 in accordance with an embodiment of the present disclosure. The authentication system 500 comprises a mobile device 502 that communicates with a network-accessible service 504 to authenticate a computing system 506. The mobile device 502 includes a sign-in module 508 for receiving an input of account login information and sending the account login information to a corresponding account access module 510 of the network-accessible service 504. In response, the account access module 510 may authenticate the user, and thus allow the mobile device 502 to access information and perform actions related to an account of the user.

The mobile device 502 also includes an initial setup determination module 512 for determining whether a computing system is being setup for the first time. The initial setup determination module 512 may determine this in any suitable manner, such as by displaying a graphical user interface element requesting this information and receiving a user input in response. If it is determined that the computing system 506 is being setup for the first time, the initial setup determination module 512 may invoke one or more modules relating to initial setup processes. As shown in FIG. 5, one example of a module relating to initial setup of a computing device includes a wireless settings input module 514. The wireless settings input module 514 may receive a user input of wireless settings information usable to wirelessly connect the computing system to a network.

Figure 6:
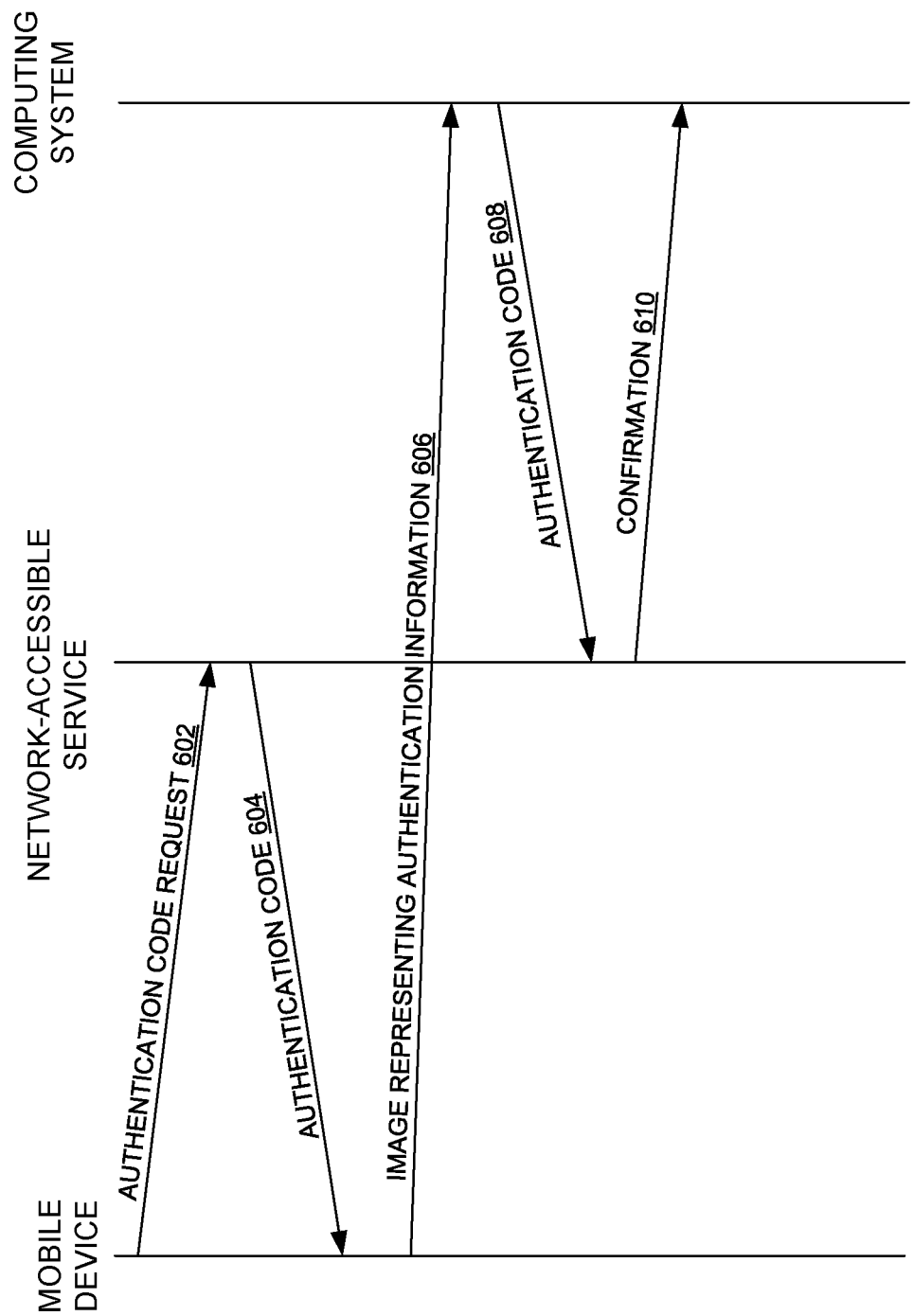
FIG. 6 shows example communications between elements of the system of FIG. 5 in accordance with an embodiment of the present disclosure.

The mobile device 502 further comprises a code representation generation module 516. As shown in FIG. 3, the code representation generation module 516 may present a user the option to instruct the mobile device 502 to request an authentication code from the network-accessible service 504, to receive the authentication code from the network-accessible service 504, and to generate a representation of authentication information including the authentication code. To obtain the authentication code, the code representation generation module 516 may communicate with a code generation module 518 of network-accessible service 504 to request and receive an authentication code from the network-accessible service 504. Turning briefly to FIG. 6, which shows example communications between a mobile device, a network-accessible service, and a computing system, the request sent by the code representation generation module 516 to the code generation module 518 is illustrated as authentication code request 602.

Upon receipt of this request, the code generation module 518 may produce a restricted-use authentication code. Further, the code generation module 518 also may encode other information, such as wireless network settings, received from the mobile device 502. Referring briefly again to FIG. 6, the code generation module 518 is illustrated at 604 as sending the authentication information, including the restricted-use authentication code and potentially other information, to the authentication code representation generation module 516.

The code generation module 518 also may communicate with various other modules, such as code expiration module 520 and a companion association module 522. The code expiration module 520 may be configured to expire the authentication code produced by the code generation module 518 after the code is used by the computing system 506. Likewise, the companion association module 522 may be configured to associate a companion application and/or a companion device (e.g. mobile device 502) with another computing system being authenticated (e.g. computing system 506).

In response to receiving the authentication code from the code generation module 518, the code representation generation module 516 may generate a representation 524 of the authentication information for presentation to the computing system 506. As mentioned above, the authentication information may include any suitable information in addition to the authentication code, including but not limited to wireless settings information, user identification, user account identification and/or password, transaction information (e.g. related to content purchased by the user), etc. Also as mentioned above, the representation 524 of the authentication information may take any suitable form, including but not limited to visual and/or audio representations.

Next, the representation 524 of authentication information may be presented to the computing system 506 for capture by a sensor from which the computing system 506 receives input, as illustrated at 606 in FIG. 6. For example, the computing system 506 may include a code representation reader 528 for detecting and decoding the representation 524 to obtain the authorization information. Depending upon the content of the authorization information, the code representation reader 528 may pass all or some of the decoded authentication information to an initial setup module 530. If it is determined that an initial setup is to be performed, the wireless configuration module 532 may be provided with wireless settings information received via the authorization information, and thus may configure the wireless settings of computing system 506 to connect to a wireless network.

Further, the initial setup module 530 and/or wireless configuration module 532 may invoke a verification request module 534. The verification request module 534 may be configured to send all or some of the authentication information decoded by the code representation reader 528 to a code verification module 536 of the network-accessible service 504 to verify that the authentication code was received and transmitted to the network-accessible service, as shown at 608 of FIG. 6.

The code verification module 526 may query the code expiration module 520 to expire the authentication code, such that the authentication code is not available for any further use. Further, the code verification module 536 may send a confirmation of authentication to the computing system 506, as shown at 610 of FIG. 6, thereby completing authentication of computing system 506. Further, information regarding the identities of the mobile device 502 and the computing system 506 may be stored by companion association module 522 so that the paired relationship between these devices is stored in association with the user account.

Figure 7A:
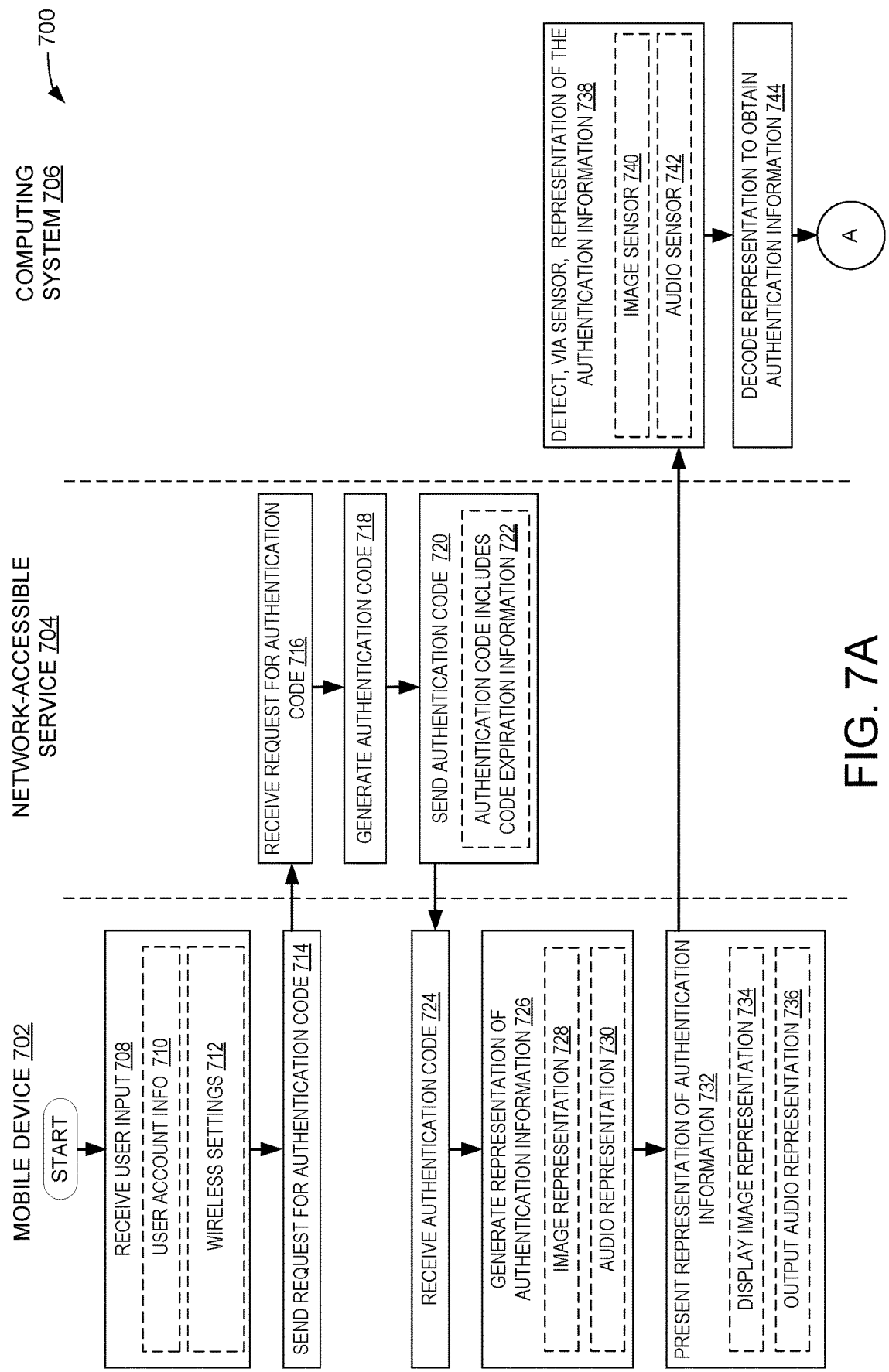
FIGS. 7A and 7B show embodiments of methods of performing an authentication via a restricted-use authentication code in accordance with an embodiment of the present disclosure.
Figure 7B:
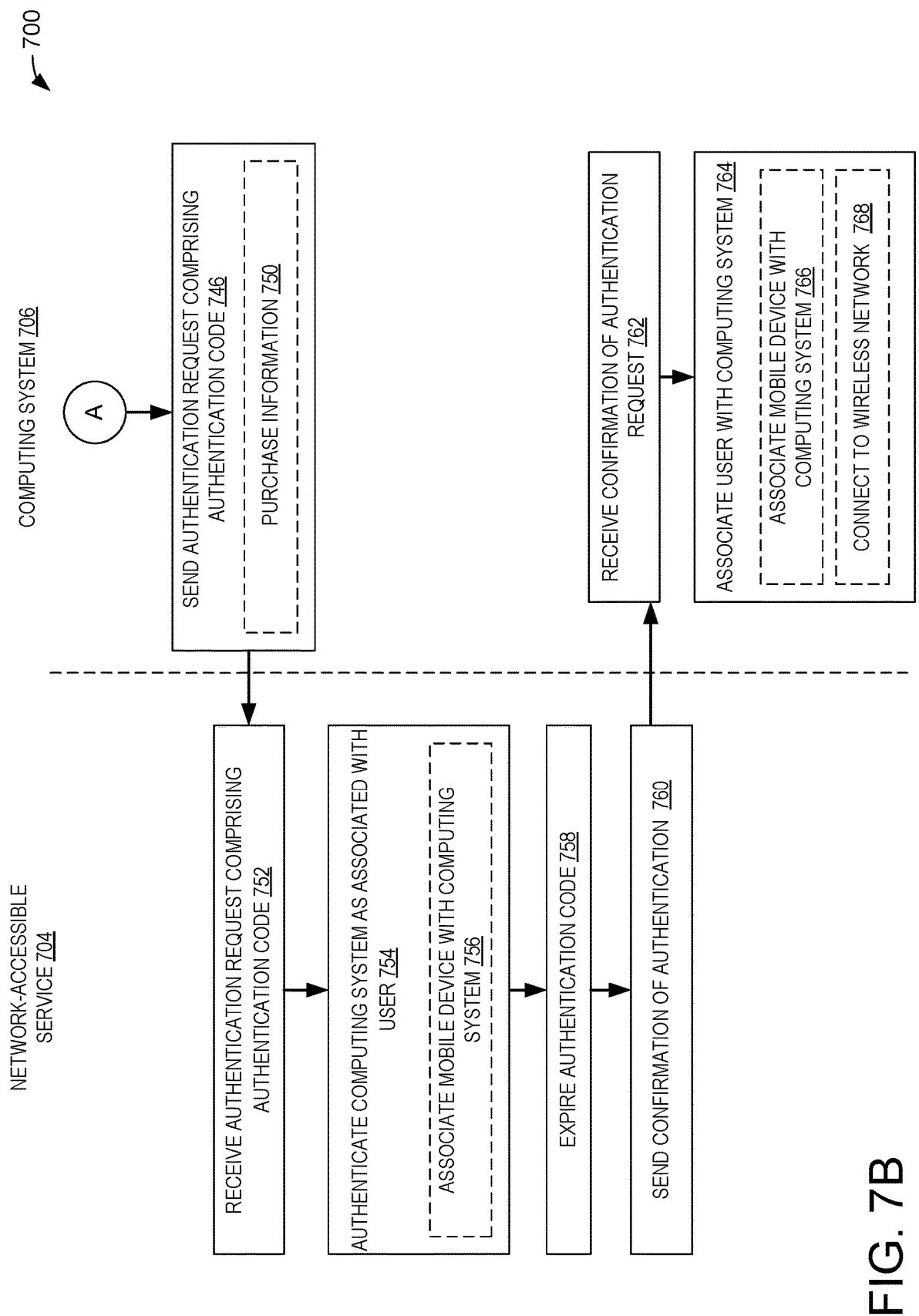

FIGS. 7A and 7B show a flow diagram depicting an embodiment of a method 700 of performing an authentication process, and illustrates processes performed by each of a mobile device 702, a network-accessible service 704, and a computing system 706. Method 700 comprises, at 708 receiving user input at mobile device 702. As indicated at 710 and 712, the user input may include user account information and/or wireless settings, respectively. As such information may be in the form of alphanumeric strings, the user may utilize an input mechanism on the mobile device configured to facilitate such character input, such as a hardware or software keyboard. While shown in FIGS. 7A-7B in the context of a mobile device, it will be understood that any other suitable computing device may be used.

The user input also may include any other suitable information, such as information regarding item purchased by a user. For example, if a user purchases a game to play on the computing system, the purchase information may include a product code or other information identifying and authenticating the purchase.

After receiving user input, the mobile device 702 may send a request for an authentication code, as indicated at 714. The network-accessible service 704 may receive the request for the authentication code at 716, generate the authentication code at 718, and send the authentication code to the mobile device at 720, potentially with other authentication information. For example, as indicated at 722, in some embodiments, the authentication code may include code expiration information. The code expiration information may specify, for example, an expiration time threshold for the authentication code, such that the restricted-use authentication code may be expired in response to an amount of time elapsing that is greater than the expiration threshold. The code expiration information may also comprise any other suitable information for expiring the authentication code.

Method 700 further comprises receiving the authentication code at the mobile device 702, as indicated at 724. The mobile device then may generate a representation of the authentication code, and potentially of other authentication information at 726. The representation may take any suitable form. For example, the authentication information may be presented as an image representation and/or an audio representation, as indicated at 728 and 730, respectively.

After generating the representation of the authentication information, method 700 further comprises presenting the representation of the authentication information to the computing system 706, as indicated at 732. For example, where the representation includes an image representation, then the mobile device 702 may display the image representation, as indicated at 734. Likewise, if the representation includes an audio representation, the mobile device 702 may output the audio representation via speaker, as indicated at 736.

Next at 738, method 700 includes detecting, via data acquired via one or more sensors, the representation of the authentication information at the computing system. Example sensors include, but are not limited to, an image sensor 740 (e.g. a two-dimensional image sensor or depth sensor) and an audio sensor 742. In some embodiments, additional and/or alternative sensors may be configured to detect a representation of authentication information from the mobile device 702. Further, the sensor(s) may be integrated within and/or communicatively connected to the computing system 706.

At 744, method 700 includes decoding the representation of the authentication information, thereby obtaining the authentication information. The computing system 706 then may identify the authentication code, and send an authentication request comprising the authentication code to the network-accessible service 704, as indicated at 746. As indicated at 750, the authentication request may optionally comprise one or more portions of the authentication information, including purchase information relating to an item purchased by a user in order to validate the purchase information with the network-accessible service 704.

The method 700 further includes receiving, at the network-accessible service 704, the authentication request comprising the authentication code at 752. After receiving the authentication request, the network-accessible service 704 may authenticate the computing system as being associated with the user. On the other hand, if the authentication code is not determined to be valid, authentication may be denied. As indicated at 756, in some embodiments, the network-accessible service 704 may further associate the mobile device with the computing system based upon receiving the authentication code.

Method 700 further includes expiring the authentication code at 758 after authenticating the computing device. In this manner, an image or other representation of the authentication code improperly obtained from the mobile device may not be used to authenticate any other devices. Method 700 further includes sending a confirmation of authentication to the computing system at 760.

As indicated at 762, the computing system 706 receives the confirmation of the authentication request, and in response, associates the user with the computing system at 764. For example, the computing device may access user account and/or user account profile information on the computing system. The computing system 706 may also associate itself with the mobile device 702 and/or an application running on the mobile device, as indicated at 766. Additionally, the computing device may utilize wireless settings transmitted as authentication information to connect to a wireless network.

Figure 8:
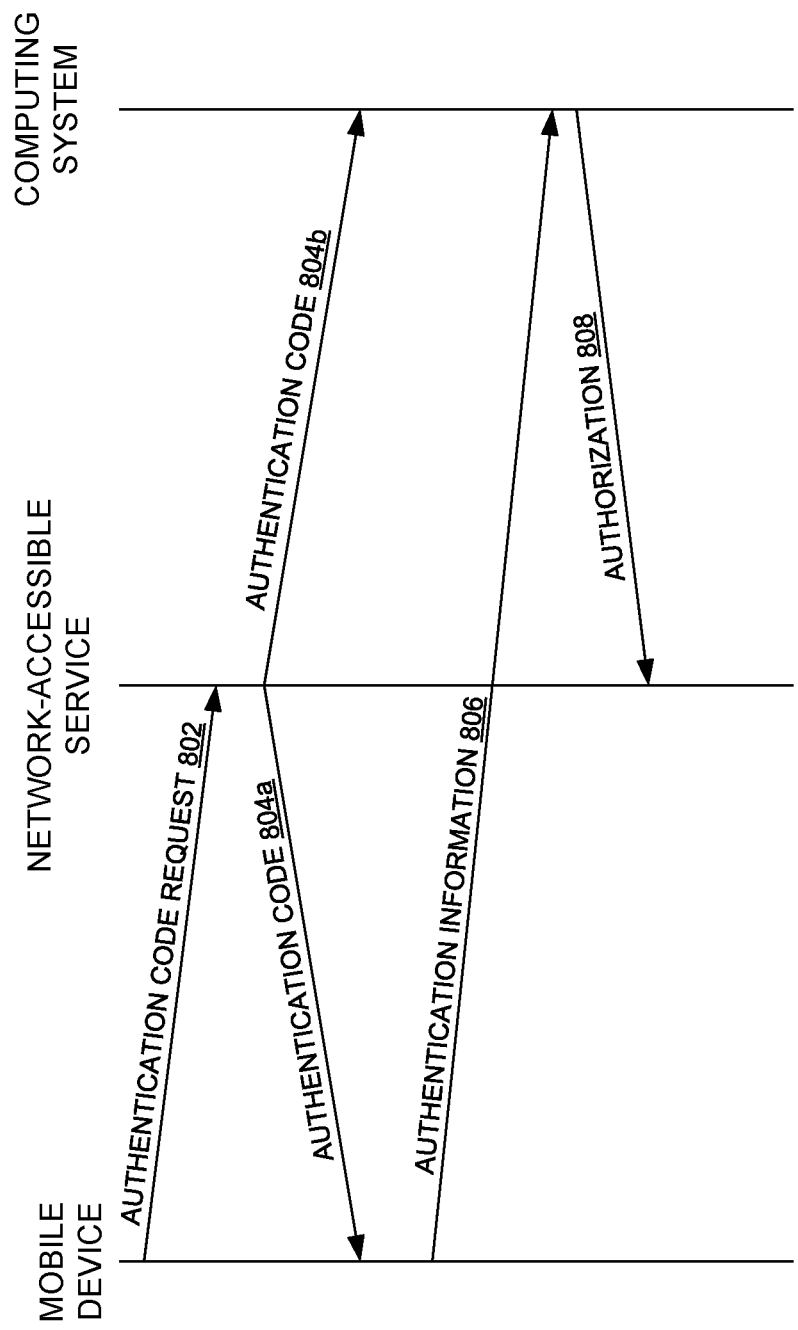
FIG. 8 shows example communications between elements of the system of FIG. 5 in accordance with another embodiment of the present disclosure.

FIG. 8 illustrates another example embodiment of restricted-use authentication in which the computing system is already associated with the user of a mobile device. Such authentication may be used, for example, in the purchase of content for the computing system, to add another user account to the computing system, etc. As indicated at 802, an authentication code request is sent from a mobile device to a network-accessible service in order to initiate a handshake operation for authenticating a computing system. In response, the network-accessible service may send authentication information comprising an authentication code to both the mobile device and the computing system, as indicated at 804*a* and 804*b*, respectively.

Next, method 800 comprises sending the authentication information from the mobile device to the computing system indicated at 806. For example, as described above, the authentication information may be presented to the computing system in the form of a graphical representation of the authentication information and/or an audio representation. In response, the computing system may perform the authentication locally, and send an indication of a successful authentication to the network-accessible service in the form of the authorization indicated at 808.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
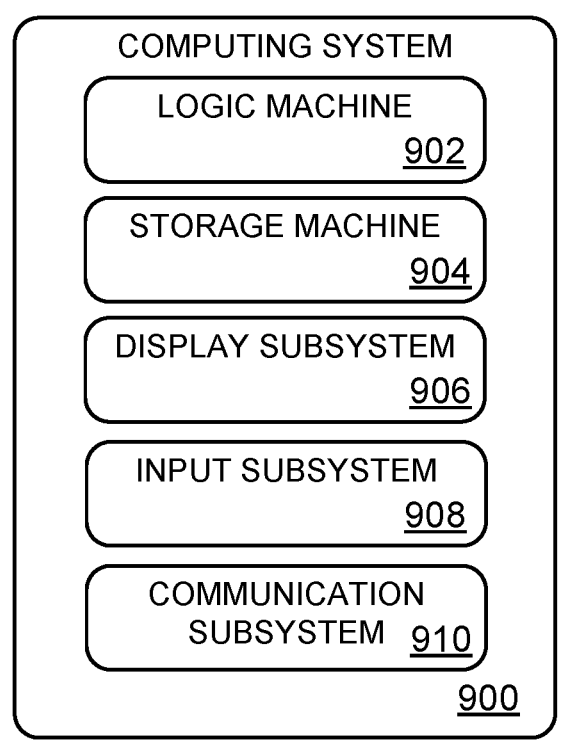
FIG. 9 shows a block diagram of an example computing system in accordance with an embodiment of the present disclosure.

FIG. 9 schematically shows a non-limiting embodiment of a computing system 900 that can enact one or more of the methods and processes described above. The computing system 900 is shown in simplified form. The computing system 900 may take the form of one or more gaming consoles, mobile communication devices (e.g., smart phone), mobile computing devices, tablet computers, server computers, home-entertainment computers, network computing devices, personal computers, and/or other computing devices.

The computing system 900 includes a logic machine 902 and a storage machine 904. The computing system 900 may optionally include a display subsystem 906, an input subsystem 908, a communication subsystem 910, and/or other components not shown in FIG. 9.

The logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The storage machine 904 includes one or more physical devices configured to store and hold instructions (e.g., computer-readable instructions) executable by the logic machine to implement the methods and processes described herein. For example, the logic machine 902 may be in operative communication with a sensor interface (e.g. an interface of the sensor system 106 of FIG. 1), and the storage machine 904. When such methods and processes are implemented, the state of the storage machine 904 may be transformed—e.g., to hold different data.

The storage machine 904 may include removable and/or built-in devices. The storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that the storage machine 904 includes one or more physical devices. However, aspects of the instructions described herein alternatively may be propagated by a communication medium (e.g., an electromagnetic signal, an optical signal, etc.).

Aspects of the logic machine 902 and the storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, the display subsystem 906 may be used to present a visual representation of data held by the storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. The display subsystem 906 may include one or more display devices utilizing virtually any type of technology. Such display devices may be combined with the logic machine 902 and/or the storage machine 904 in a shared enclosure, or such display devices may be peripheral display devices.

When included, the input subsystem 908 may comprise or interface with one or more user-input devices such as a touch screen, keyboard, mouse, microphone, or game controller. For example, the input subsystem may include or interface with the first computing device 102 and/or the second computing device 110 of FIG. 1. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 910 may be configured to communicatively couple the computing system 900 with one or more other computing devices. The communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of performing an authentication process, the method comprising:
   detecting, via an image sensor, an image displayed via a mobile device, the image comprising an optically readable tag;
   decoding the optically readable tag to determine an authentication code for authenticating the computing device;
   sending, to a network-accessible service, an authentication request comprising the authentication code, the authentication request comprising a request to authenticate computing device information and user information for a user;
   receiving a confirmation of the authentication request from the network-accessible service; and
   associating the user to the computing device based at least upon receiving the confirmation of the authentication request from the network-accessible service.

2. The method of claim 1, wherein detecting the image further comprises detecting a representation of user-input data comprising setup information usable to set up the computing device.

3. The method of claim 1, wherein the authentication code further comprises identification information relating to one or more of the mobile device and an application on the mobile device.

4. The method of claim 3, further comprising associating the mobile device to the computing device based at least upon receiving the confirmation of the authentication request from the network-accessible service.

5. The method of claim 1, wherein the authentication code further comprises purchase information relating to an item purchased by the user, and the method further comprising validating the purchase information with the network-accessible service.

6. The method of claim 1, wherein the authentication code further comprises wireless settings information, and the method further comprising configuring the computing system in accordance with the wireless settings information to connect the computing system to a wireless network.

7. The method of claim 1, wherein the optically readable tag comprises a graphical code.

8. The method of claim 1, wherein the optically readable tag comprises one or more alphanumeric characters.

9. The method of claim 1, wherein receiving the authentication code further comprises receiving code expiration information specifying an expiration threshold for the authentication code.

10. The method of claim 9, wherein the expiration threshold comprises an expiration time threshold.

11. A computing system comprising:
   an image sensor;
   a logic machine; and
   a storage machine storing instructions executable by the logic machine to:
     detect, via the image sensor, an image displayed via a mobile device, the image comprising an optically readable tag;
     decode the optically readable tag to determine an authentication code for authenticating the computing system;
     send, to a network-accessible service, an authentication request comprising the authentication code, the authentication request comprising a request to authenticate computing device information and user information for a user;
receive a confirmation of the authentication request from the network-accessible service; and
associate the user to the computing system based at least upon receiving the confirmation of the authentication request from the network-accessible service.

12. The computing system of claim 11, wherein detecting the image further comprises detecting a representation of user-input data comprising setup information usable to set up the computing system.

13. The computing system of claim 11, wherein the image sensor comprises one or more of a depth camera and a two-dimensional camera.

14. The computing system of claim 11, wherein the authentication code further comprises identification information relating to one or more of the mobile device and an application on the mobile device, and the instructions are further executable to associate the mobile device to the computing system based at least upon receiving the confirmation of the authentication request from the network-accessible service.

15. The computing system of claim 11, wherein the optically readable tag comprises a graphical code.

16. The computing system of claim 11, wherein the optically readable tag comprises one or more alphanumeric characters.

17. A computer-readable storage machine storing instructions executable by a logic machine to:
detect, via an image sensor of a first device, an image displayed via a mobile device, the image comprising an optically readable tag;
decode the optically readable tag to determine an authentication code for authenticating the first device;
send, to a network-accessible service, an authentication request comprising the authentication code, the authentication request comprising a request to authenticate first device information and user information for a user;
receive a confirmation of the authentication request from the network-accessible service; and
associate the user to the first device based at least upon receiving the confirmation of the authentication request from the network-accessible service.

18. The computer-readable storage machine of claim 17, wherein detecting the image further comprises detecting a representation of user-input data comprising setup information usable to set up the first device.

19. The computer-readable storage machine of claim 17, wherein the optically readable tag comprises a graphical code.

20. The computer-readable storage machine of claim 17, wherein the optically readable tag comprises one or more alphanumeric characters.

* * * * *